United States Patent [19]

Swarat

[11] 3,823,301
[45] July 9, 1974

[54] APPARATUS FOR GRANULATING STRAND OR ROD-SHAPED MATERIAL

[75] Inventor: Walter Swarat, Elmhurst, Ill.

[73] Assignee: Condux-Werk Herbert A. Merges KG, Wolfgang near Hanau, Germany

[22] Filed: Dec. 8, 1972

[21] Appl. No.: 313,566

[30] Foreign Application Priority Data
Dec. 9, 1971  Germany............................ 2161004

[52] U.S. Cl............... 219/121 L, 83/356.3, 83/913, 241/1, 264/22, 264/148
[51] Int. Cl............................................ B23k 27/00
[58] Field of Search ........ 219/121, 384; 264/22, 25, 264/141, 142, 143; 83/355, 913; 425/311, 313, 314; 241/1, 277

[56] References Cited
UNITED STATES PATENTS
| | | | |
|---|---|---|---|
| 3,025,564 | 3/1962 | Voigt................................. | 264/142 |
| 3,089,194 | 5/1963 | Goins.................................. | 264/143 |
| 3,226,527 | 12/1965 | Harding............................ | 219/121 L |
| 3,325,819 | 6/1967 | Fraser .............................. | 219/121 L |
| 3,582,466 | 6/1971 | Quirk ........................... | 219/121 LA |
| 3,594,261 | 7/1971 | Broerman ..................... | 219/121 LM |
| 3,596,319 | 8/1971 | McKenica............................. | 65/112 |
| 3,614,367 | 10/1971 | Medley ....................... | 219/121 LM |
| 3,634,646 | 1/1972 | Berger............................. | 219/121 L |
| 3,684,474 | 8/1972 | Chisholm..................... | 219/121 LM |

Primary Examiner—J. V. Truhe
Assistant Examiner—Clifford C. Shaw
Attorney, Agent, or Firm—Spencer & Kaye

[57] ABSTRACT

Material which has been shaped into the form of rods or strands is cut into pieces, adjacent the region where it is shaped, by a laser beam directed transverse to the length of the rods or strands.

2 Claims, 5 Drawing Figures

Fig. 3

PATENTED JUL 9 1974　　　　　　　　　　　3,823,301

APPARATUS FOR GRANULATING STRAND OR ROD-SHAPED MATERIAL

BACKGROUND OF THE INVENTION

The present invention relates to an apparatus for granulating material furnished in strand or rod shape. Known devices for this purpose operate with rotating blades which, if the granulation is a dry one, cooperate with at least one fixed blade. The feeding of the strands or rods may occur individually or together. All of these granulators have the common feature that the strand or rod-shaped material is comminuted to a given length by means of rotating blades.

The drawback of these known granulators is that, if fixed and rotating blades are used, the cutting gap between the fixed and rotating blades must be very accurately set since otherwise the cut will not be perfect. With increasing wear of the blades this cutting gap of course changes so that such granulating machines require very careful and regular maintenance work which, depending on the design of such a machine is more or less complicated. In any case the maintenance work, such as grinding of the blades and resetting of the cutting gap lead to relatively long periods of time in which the machine can not be used.

Particularly when granulating plastic strands, relatively long cooling paths must be provided in the appropriate installations since the strands arriving in a plastic form must have a certain stability before they can be cut up in known granulators.

Further drawbacks result from the operating noise which such known apparatus produce and which may prove damaging to the health of the operating personnel.

Even underwater granulation of plastic strands involves some of these drawbacks.

German Offenlegungsschrift (Laid Open Application) No. 1,779,775 discloses a method for cutting, severing or profiling of foamed materials of all types as well as similar materials. According to this method the cutting, severing or profiling is effected by means of a laser beam which is advanced along the desired cutting line at high speed. This method is thus particularly suited for cutting respective work pieces to a pattern. The pieces to be worked according to this method consist exclusively of solid materials which have reached the final stage in their production. This method is therefore not suited for granulating strand or rod-shaped material because this material may still be in a plastic, i.e., unstable state.

SUMMARY OF THE INVENTION

It is therefore an object of the present invention to provide an apparatus for granulating strand or rod-shaped material which does not have the above-described drawbacks of the known mechanical machines, i.e., those operating with rotating blades, and which nevertheless assures perfect cuts under consideration of a given granulate length.

This is accomplished with a device of the above-mentioned type in that, according to the present invention, the strands or rods are cut by a laser beam in the immediate area where they are being produced, as at the nozzle plate or the like. The granulate length will depend on the advancing speed of the strands or rods and the pulse sequence of the laser beams.

In a further embodiment of the present invention the granulating device includes a rotating laser beam source whose beams impinge perpendicularly on strands or rods coming out of a nozzle plate and the strands or rods are cut while they are in free fall.

DESCRIPTION OF THE PREFERRED EMBODIMENT

Figure 1:
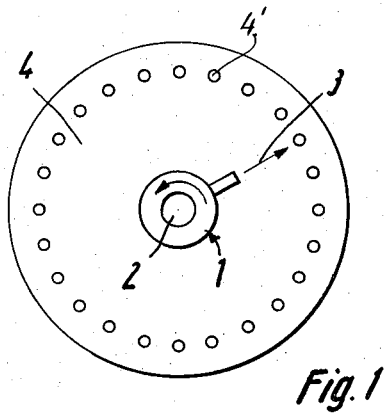
FIG. 1 is a bottom plan schematic view of a rotating granulating device according to the invention disposed underneath a circular nozzle plate.
Figure 2:
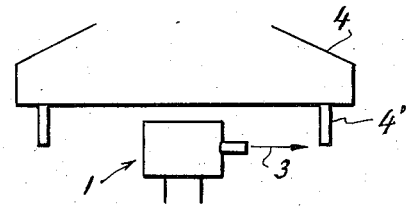
FIG. 2 is a vertical schematic view of the granulating device of FIG. 1.

FIGS. 1 and 2 show a granulating apparatus 1 which includes a rotating laser beam source 2 disposed in a housing (not shown).

The laser beam source can be of the ruby laser beam type or of the gas laser beam type. Preferably a gas laser of the $CO_2$ type is used to provide sufficient cutting strength. Either type of laser beam source can be pulsed in a known manner. The $CO_2$ laser beam source can be of the type produced and sold by North American Rockwell Corp. of the United States.

As an example of the use of the apparatus according to the invention, a laser beam source of the $CO_2$ type can be used to cut strands of plastic material such as polyester or Nylon 6.6 in the thermo-elastic stage, as it issues from the nozzles of the nozzle plate, or after it has been cooled to a solid state. The strands of the material generally range between 2–5 millimeters in diameter and, using a laser beam source which consumes up to approximately 3 kilowatts of power, the strands can be cut within a time period of approximately 10 to 100 $\mu sec$.

A supply source such as a circular nozzle plate 4 is disposed above the granulating apparatus 1 and thermoplastic strands, which are to be cut, exit from this plate in a radial pattern. The exit region may or may not be equipped with a cooling medium, which may be liquid or gas. These strands are brought to the granulating device 1 which is disposed centrically below the nozzle plate 4. A laser beam 3 produced by the beam source 2 irradiates the strands exiting from the nozzles 4' of the nozzle plate 4, and the beam is so positioned that its beam direction is perpendicular to the axis of the individual strands. The individual strands are severed by means of the laser radiation and, the length of the resulting granulate is dependent on the speed of rotation of the laser beam 3 as well as the speed at which the strands travel past the beam source, that is, perpendicular to the orientation of the nozzles 4'.

Figure 3:
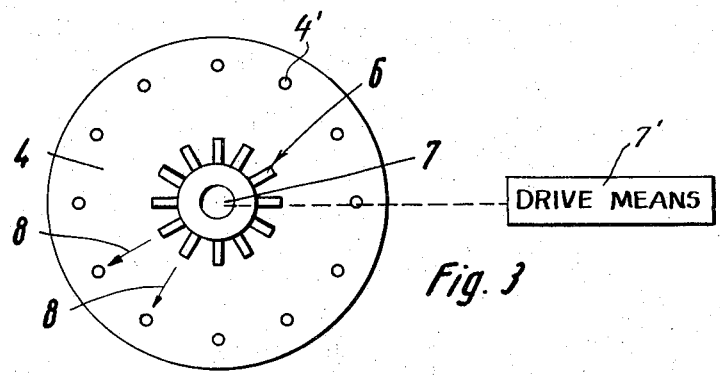
FIG. 3 is a bottom plan schematic view of a stationary granulating device disposed underneath a nozzle plate as shown in FIG. 1.

As seen in FIG. 3 a granulating device 6 for producing laser radiation is also centrically disposed below the supply source such as the nozzle plate 4. The beam source 7 of the granulating device 6 is so designed that the radiation is composed of a plurality of individual beams 8 which are adapted in their length and number to the number of nozzles 4' disposed in the nozzle plate 4. In the granulating device 6 shown in FIG. 3 the strands which exit for the nozzles 4' are cut off by pulsed laser beams 8. The repetition frequency of the laser beam pulses in conjunction with the strand speed are determinative for the length of the granulate.

Depending on the diameter of the strands the laser beam source may perform intermittent rotary movements over a relatively narrow angular range transvere to the orientation of the nozzles 4' so that the individual strands or rods can be smoothly severed over their entire diameter. This can be done by appropriate means known in the art and is shown in block form at 7'.

Figure 4:
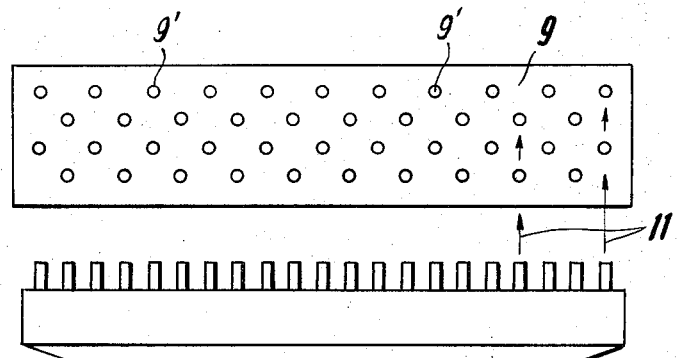
FIG. 4 is a schematic, bottom plan view showing a granulating device and an associated rectangular nozzle plate.

FIG. 4 shows a supply source in the form of a rectangular nozzle plate 9, with a stationary granulating device 10 disposed next to this plate but at a lower level. The device 10 is arranged to emit a plurality of laser beams 11. The relation set forth above regarding the division of the radiation into individual beams in the arrangement of FIG. 3 also apply here so that one beam 11 is associated with each row of strands exiting from nozzles 9' in nozzle plate 9. The same is true for the determination of the granulate length.

Figure 5:
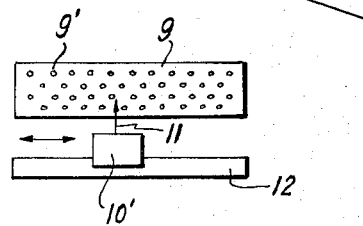
FIG. 5 is a view similar to FIG. 4 showing another embodiment of the invention.

It is of course also possible to sweep a single laser beam along the rectangular nozzle plate in such a manner that all strands or rods ejected by the plate are cut off a short distance below the plate. Such an embodiment is illustrated schematically in FIG. 5 of the drawings, where the device 10' producing a single beam 11 is shown as movable along a guide member 12.

Strands or rod of other materials can also be granulated in the manner described for thermoplastic synthetic material strands, since partically all known materials can be cut by means of laser beams. The comments made above regarding the nozzle plates also apply accordingly to other types of strand production.

The important condition is that, particularly when cutting temperature and oxidation-sensitive materials, the cutting be effected in the absence of oxygen. This may be accomplished in two ways: by operating with $CO_2$ lasers; or by treating material to be cut in an inert environment constituted by a cooling gas or liquid.

The particular advantage of the present invention, especially when granulating thermoplastic materials, lies in the fact that the cutting takes place without mechanical influence. Whereas in all known prior granulating methods the thermoplastic strands of synthetic material had to have reached a certain stability before the granulation could take place, this is no longer required according to the present invention. Of course, with a material which is still quite plastic, each individual granulate particle must be surrounded by a cooling medium immediately after the completed cutting action in order to prevent sticking.

With the new apparatus according to the invention the previously required relatively long cooling paths for cooling the strands can be eliminated. This results in a substantially more compact arrangement of the apparatus.

The present invention can also be used for synthetic materials, such as polyester and nylon 66, which can not be granulated according to the conventional hot chopping method, because the present invention provides that the nozzle in no case need be surrounded by a cooling medium and the strands are fed to the granulating device in a free fall.

All previously known granulating devices — and these are exclusively mechanical devices — make considerable noise during operation. In most places of fabrication not only one granulator but rather a plurality of such granulator banks comprising a plurality of mechanical, noisy granulators are in operation at the same time. This total amount of noise in particular proves damaging to the health of the operating personnel for these machines. Since the novel granulator operates noiselessly, this drawback is also eliminated.

It will be understood that the above description of the present invention is susceptible to various modifications, changes and adaptations, and the same are intended to be comprehended within the meaning and range of equivalents of the appended claims.

I claim:
1. An apparatus for producing granulated material, comprising in combination:
   a. means including a plurality of parallel oriented nozzles arranged in a circular array for forming a plurality of rods or strands of a plastic material;
   b. laser beam producing means mounted in the center of the circular array and including means for emitting a plurality of individual laser beams in a radial array with respect to said center towards separate ones of said nozzles in a direction perpendicular to the orientation of said nozzles to sever into granules the strands or rods emitted by the separate nozzles, the severing being effected in the immediate vicinity of the region where the rods or strands are formed; and
   c. control means connected for causing the laser beams to strike the rods or strands periodically; the rate at which the rods or strands are struck by the beam and the speed of advancement of the rods or strands determining the length of each granule.

2. Apparatus as defined in claim 1, wherein said control means comprise drive means connected to said beam producing means for imparting intermittent rotary movement to each laser beam over an angular range in a direction transverse to the orientation of said nozzles to cut through the separate strands or rods to be severed.

* * * * *